Nov. 24, 1936.  P. A. BROWN  2,061,957

CAKE BOX

Filed Jan. 14, 1936

Inventor

Pauline A. Brown

By Mawhinney & Mawhinney

Attorneys.

Patented Nov. 24, 1936

2,061,957

UNITED STATES PATENT OFFICE 2,061,957

CAKE BOX

Pauline A. Brown, Victoria, Tex.

Application January 14, 1936, Serial No. 59,147

4 Claims. (Cl. 65—59)

The present invention relates to improvements in cake boxes and has for an object to provide an improved box or receptacle for cake or other food stuffs wherein the same will be isolated from access by ants and the like.

The invention also has for an object to provide an improved cake box which, besides serving its utilitarian purpose, will serve as a table decoration or centerpiece in which flowers may be placed.

The invention has for a further object to provide an improved cake receptacle with a surrounding moat of water which will not only serve to keep out ants and other crawling insects but also keep the cake from drying out, particularly in dry climates.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
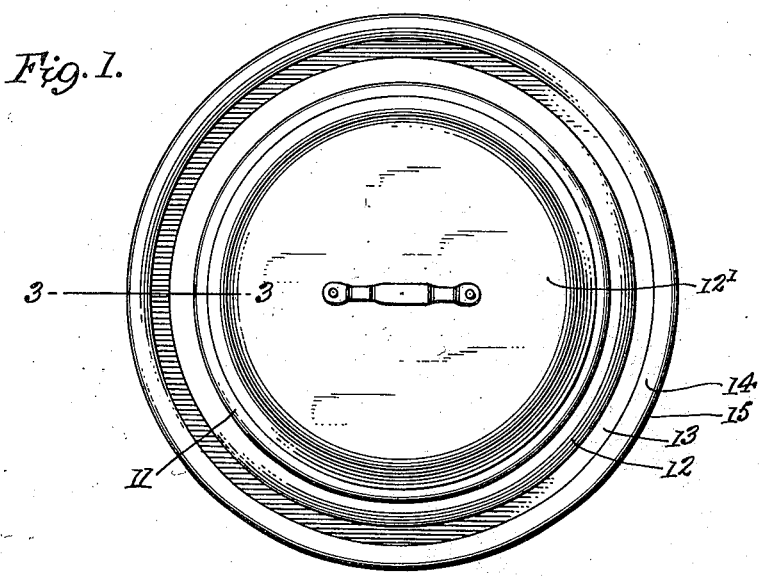
Figure 1 is a top plan view of an improved cake box constructed in accordance with the present invention.
Figure 2:
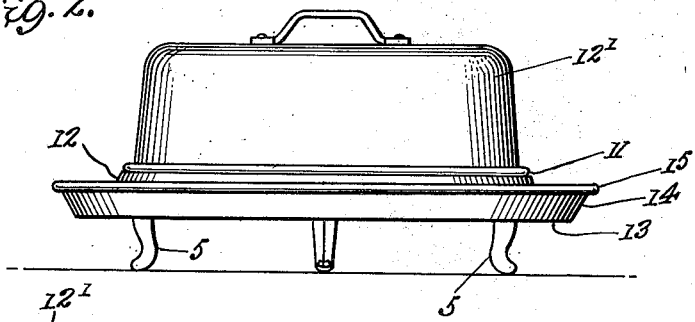
Figure 2 is a side elevation of the same.
Figure 3:
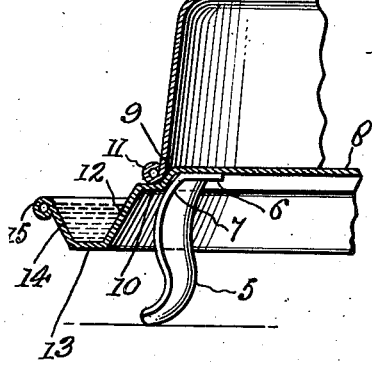
Figure 3 is a fragmentary vertical section, taken on an enlarged scale.

Referring more particularly to the drawing, 5 designates supporting legs for supporting the device at an elevation above the table or the like, such legs forming relatively small approaches for ants and the like. These legs are preferably formed with inturned flanges 6 at their upper ends and with rounded upper shoulders 7. The flanges 6 extend horizontally and directly receive thereupon the flat bottom 8 which forms the supporting surface for the cake or other articles of food. This bottom 8 may be formed of sheet metal or other appropriate material, the same being bent downwardly at its circumferential edge to produce a marginal substantially diagonal flange 9 against which the bulged-out walls 7 of the legs are adapted to engage for centering the legs and for reinforcing the flange 9.

Outwardly upon the diagonal flange 9 is a substantially horizontal annular seat 10 for the lower beaded edge 11 of the inverted cup-shaped cover 12'. The seat 10 is also preferably formed in one piece with the bottom 8 and extends horizontally off the lower end of diagonal flange 9.

A trough is suspended from the seat 10 and preferably formed in the same piece with the bottom 8, flange 9 and seat 10. Such trough is composed of an inner wall 12, a bottom wall 13 and an outer wall 14 advantageously having the beaded free edge 15. The walls 12 and 14 are shown to diverge upwardly from a rather narrow bottom wall 13. This construction is for the purpose of providing a relatively deep holder for a body of water the surface of which is comparatively wide across the same due to the divergent character of the walls. In this way ants or other crawling insects will not be able to bridge the gap across the water and the cake or other food stuffs upon the pan or bottom 8 will be retained in security against these pests. Moreover the trough will maintain a substantial body of water surrounding the cake box with a relatively wide surface of exposure to the surrounding air whereby to facilitate evaporation and the taking up of moisture in and by the air about the cake, which will have the effect to prevent drying out of the cake; and this will be particularly useful in dry climates. The beaded edge 11 will reinforce the cover 12' and will also provide a relatively large surface for seating upon the horizontal seat 10. Moreover this beaded flange having the rounded wall will easily ride down upon the diagonal flange 10 thus centering the cover 12' upon the seat 10. It will be noted that the seat 10 is stepped down from the bottom 8 thus not only retaining the cover 12' against lateral displacement but also forming a more effective closure for the box than if the flange simply rested upon the bottom 8.

Figure 4:
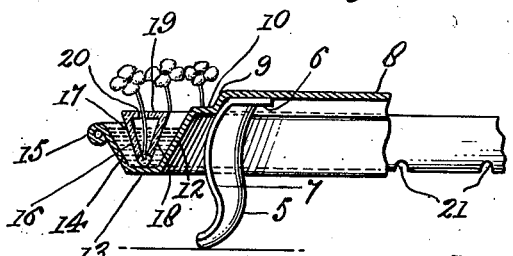
Figure 4 is a similar view showing the decoration.

In Figure 4 I have illustrated a frog or other form of holder 16 for flowers or other decorations. This frog is also preferably formed of V-shaped walls 17 and 18 and with the top wall 19 formed with numbers of perforations 20 therein to receive the stems of the flowers. The lower edge of the frog or flower holder is formed with openings 21 to admit the water from the trough into the interior of the frog or holder. In this way the water will serve the dual purpose of producing a moat to defend the cake box from the ravages of the insects and to supply moisture to the flowers for their longer preservation.

The frog or flower holder is so constructed as to leave unimpaired substantial surface areas of the water to prevent the insects from bridging across to the holder and to the box. In this aspect the cake box may be used as a centerpiece or table decoration.

It will also be noted that the beaded edge 11 of the cover 12' is not required to dip into the trough or into the water which would cause drippings from the cover, when lifted, to descend upon the table cloth or upon the cake and of course this would be undesirable.

It is obvious that various changes and modifications may be made in the details of construction and design of the above specifically described embodiment of this invention without departing from the spirit thereof, such changes and modifications being restricted only by the scope of the following claims:—

What is claimed is:

1. An improved cake box comprising a bottom member, legs supporting said bottom member at an elevation above the supporting surface, said bottom member having a diagonal flange turned downwardly from its circumferential edge, and a horizontal seat turned outwardly from the lower edge of said diagonal flange, a trough suspended from said seat, and a cover for the box of inverted cup-shape form with its lower edge arranged to rest on said seat.

2. An improved cake box comprising a bottom member of sheet metal bent downwardly at its outer circumferential edge to provide a diagonal annular flange and bent outwardly from the lower edge of said flange to form a substantially horizontal seat, a trough extending downwardly and outwardly from said seat and formed with a radially narrow bottom wall and with divergent inner and outer walls whereby to provide a relatively deep moat of water surrounding the cake box with its maximum width at the surface thereof, and an inverted cup-shape cover provided with an enlarged lower free edge with rounded outer walls adapted to ride down upon said diagonal flange and to seat upon said seat.

3. An improved cake box comprising a substantially horizontal bottom member, a diagonal flange extending down annularly from the circumferential edge of the member, legs for supporting the member at an elevation above the supporting surface and having inturned flanges on which the bottom member is adapted to directly rest, an outwardly bowed vertically extending portion adjacent the flanges for taking against the diagonal flange, a horizontal seat extending outwardly from the lower edge of said diagonal flange, a trough for a body of water extending outwardly from the outer edge of said seat and formed with a narrow bottom wall and divergent inner and outer walls for holding a relatively deep body of water having a wide upper surface, an inverted cup-shaped cover for the box having a beaded lower edge for riding down on said diagonal flange and resting upon said seat, and a frog in said trough of substantially V-shaped cross-section being hollow within and having openings in its upper portion and also openings in its lower portion to admit water from the trough into the interior of the frog.

4. An improved cake box comprising a substantially horizontal bottom member, a diagonal flange extending down annularly from the circumferential edge of the member, legs for supporting the member at an elevation above the supporting surface and having inturned flanges on which the bottom member is adapted to directly rest, an outwardly bowed vertically extending portion adjacent the flanges for taking against the diagonal flange, a horizontal seat extending outwardly from the lower edge of said diagonal flange, a trough for a body of water extending outwardly from the outer edge of said seat and formed with a narrow bottom wall and divergent inner and outer walls for holding a relatively deep body of water having a wide upper surface, and an inverted cup-shaped cover for the box having a beaded lower edge for riding down on said diagonal flange and resting upon said seat.

PAULINE A. BROWN.